Nov. 25, 1952  G. B. R. FEILDEN  2,619,162
FUEL SYSTEM FOR COMPRESSOR GAS TURBINE PLANTS
Filed June 6, 1945  3 Sheets-Sheet 3

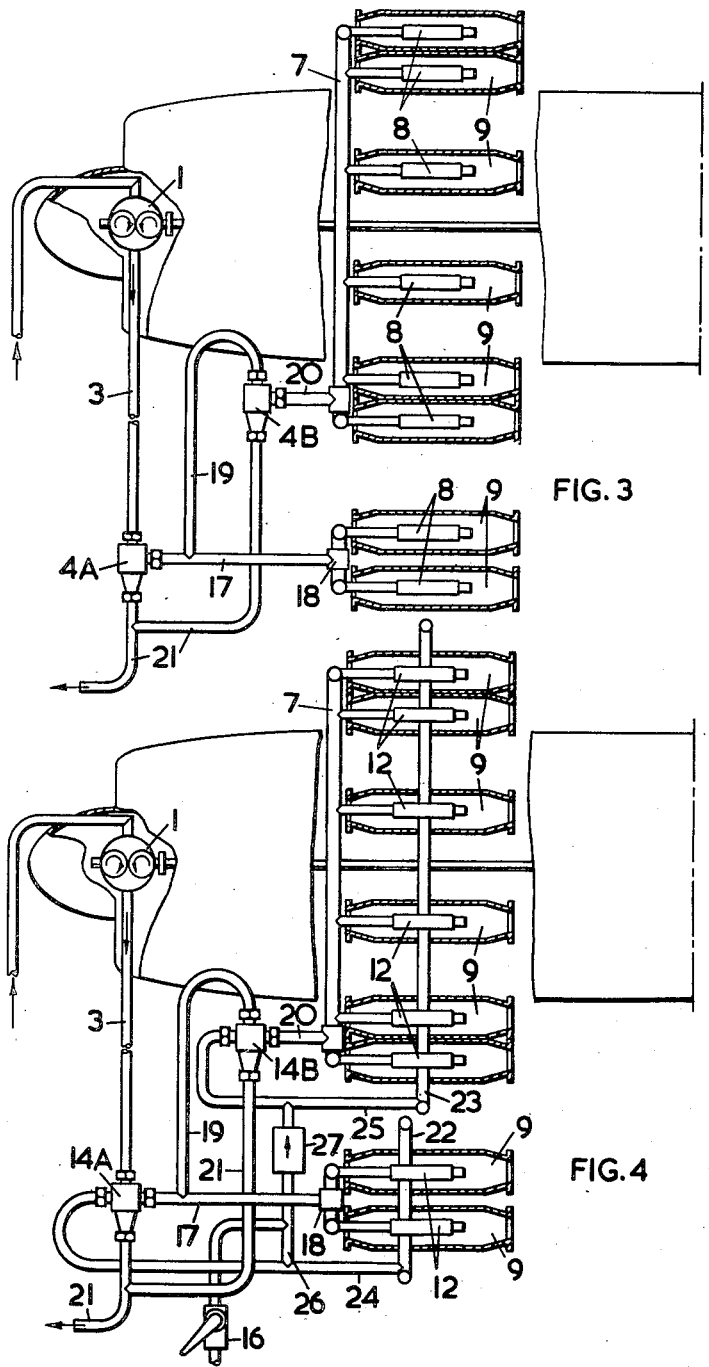

Inventor
GEOFFREY BERTRAM ROBERT FEILDEN
By
Stevens and Davis
Attorneys

Patented Nov. 25, 1952

2,619,162

UNITED STATES PATENT OFFICE 2,619,162

FUEL SYSTEM FOR COMPRESSOR GAS TURBINE PLANTS

Geoffrey Bertram Robert Feilden, Rugby, England, assignor to Power Jets (Research & Development) Limited, London, England Application June 6, 1945, Serial No. 597,911
In Great Britain October 30, 1941

8 Claims. (Cl. 158—36)

This invention relates to fuel systems for engines or propulsive systems, primarily for aircraft, and of the kind comprising a compressor in the air output of which fuel is burnt, the resultant energised gaseous mixture driving a gas turbine the shaft power of which is devoted to driving the compressor whilst the residual energy of the exhaust gases is that which is utilised, for example by driving further turbine stages to derive usable shaft power, or by discharging the exhaust gases through a jet orifice for propulsion.

The primary object of the invention is the provision of a fuel system for a compressor gas turbine plant which will only allow the supply of fuel to the engine when the fuel pressure exceeds a predetermined minimum, and which will vent or drain part of the system automatically when the fuel supply pressure falls below a pressure of the same order as in shutting down and which, as the burners are under an air pressure in the combustion chambers, will enable the compressed air to blow back through the burners and that part of the system connected to drain to prevent dribble.

The fuel system may also be used as means for controlling fuel supply to different sets of burners according to the supply pressure. Thus if there are ten burners and starting on two of them only is desirable, initial fuel supply (at a certain pressure) is to these two, and then as fuel pressure builds up owing to engine acceleration increasing the fuel pump output, the remaining eight burners are automatically cut in.

In the pressure fuel supply system according to the invention the venting or draining of part of the system is achieved by including a valve device in the supply pipe, which is adapted and arranged so as either to connect the source of fuel under pressure to a point of delivery (e. g. a connection to a fuel manifold supplying a number of burners in parallel) and in this condition to cut off a connection between the point of delivery and a vent or drain by seating, or to cut off that connection by seating and to open the point of delivery to the vent or drain, according to whether or not the supply pressure of the fuel is above or below a selected value. In the second case any fuel downstream of the valve in the system, is "dumped" from the drain, for which reason the valve is called a "dump valve" and when the point of delivery is a burner system in a combustion chamber under air pressure the fuel will be driven from the burners and from that part of the system connected to the drain. A second functionally similar valve, set to respond to a different pressure, is used where it is desired to permit supply of fuel first to one point of delivery and then on further rise of pressure to a second point.

The invention will now be described by way of example only with the aid of the accompanying drawings, in which:

Figure 3 is a diagram similar to that shown in Figure 1 but with two independent groups of burners and two "dump" valves;

Figure 4 is a diagram similar to that shown in Figure 2 but with two independent groups of burners and two "dump" valves;

Figure 1:
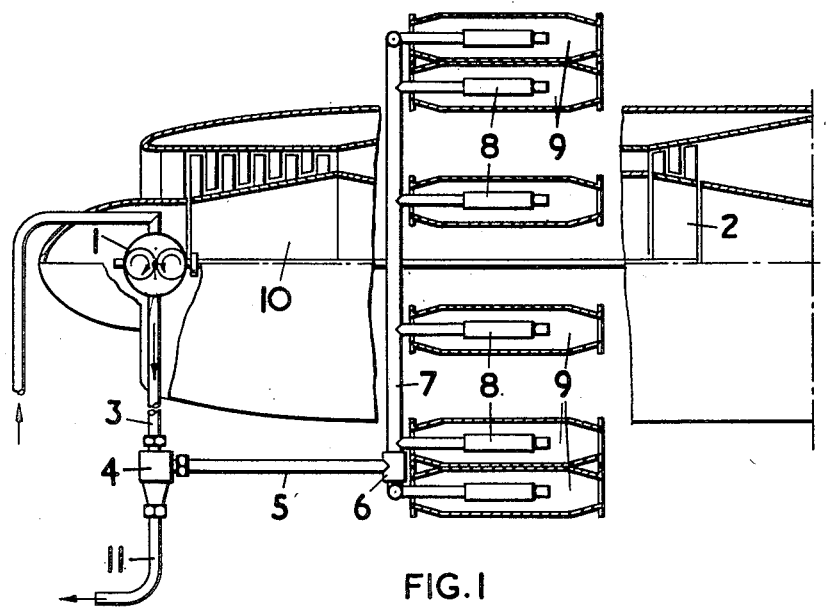
Figure 1 is a diagram of a compressor gas turbine fuel system with air blast draining of burners and "dump" valve.

Referring to the system shown in Figure 1, a fuel pump 1 which is intended to be of the positive displacement type driven by turbine 2, feeds a pressure supply pipe 3. In the run of the pipe 3 there will in the ordinary way be filters, throttle, governor, and so on as may be required, none of these being shown. This pipe 3 takes the fuel to a "dump" valve 4 (see Figure 5) and thence by pipe 5 to the point of delivery 6 which is a connection to a fuel supply manifold pipe 7, connecting a series of burners 8, one each of which is arranged in a combustion chamber 9 receiving compressed air from a compressor 10 driven by the turbine 2. From the valve 4 there leads a drain pipe 11 from which a small quantity of fuel is dumped each time the supply of fuel is stopped.

Figure 2:
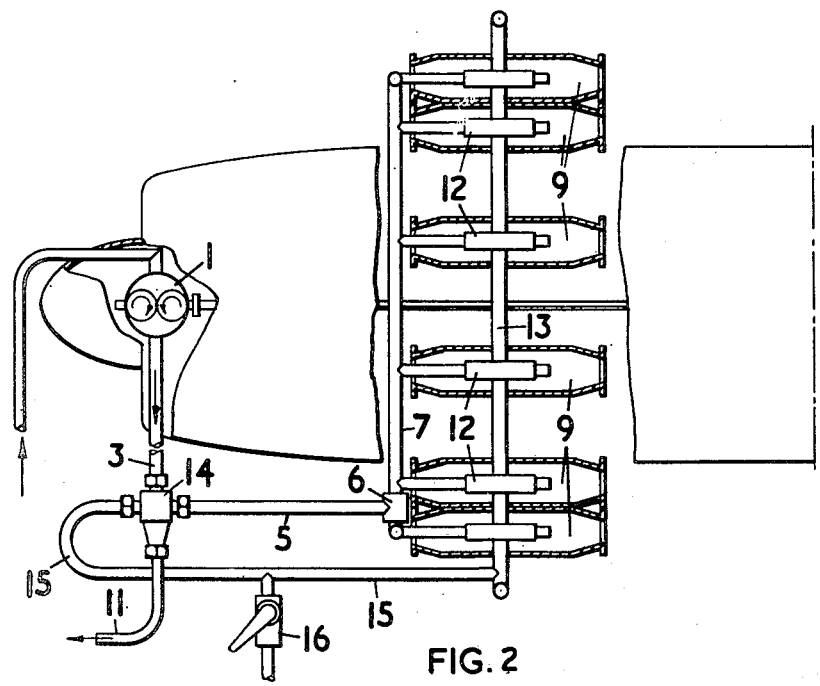
Figure 2 is a diagram of a compressor-gas turbine fuel system with air blast draining of spill controlled type burners with "dump" valve.

In Figure 2 the fuel system is somewhat similar to that shown in Figure 1 except that the burners 12 are of the spill controlled type in which fuel in excess of that required for combustion in the chambers 9 is returned to source. A manifold spill duct 13 which is provided to carry off the excess fuel from the burners 12 is connected by a pipe 15 to a "dump" valve 14 (see Figure 6). The discharge of fuel from the burners 12 is controlled by a throttle valve 16.

In Figure 3 the pump 1 as before feeds a supply pipe 3. This pipe 3 takes the fuel to a first "dump" valve 4A (see Figure 5) and thence by pipe 17 to the first point of delivery 18, which connects to a group of two burners 8 which are associated with igniters and are regarded as starting burners. From the pipe 17 a branch 19 leads to a second dump valve 4B which by pipe 20 supplies the remainder of the burners 8. The two valves 4A and 4B have a common drain 21.

Figure 6:
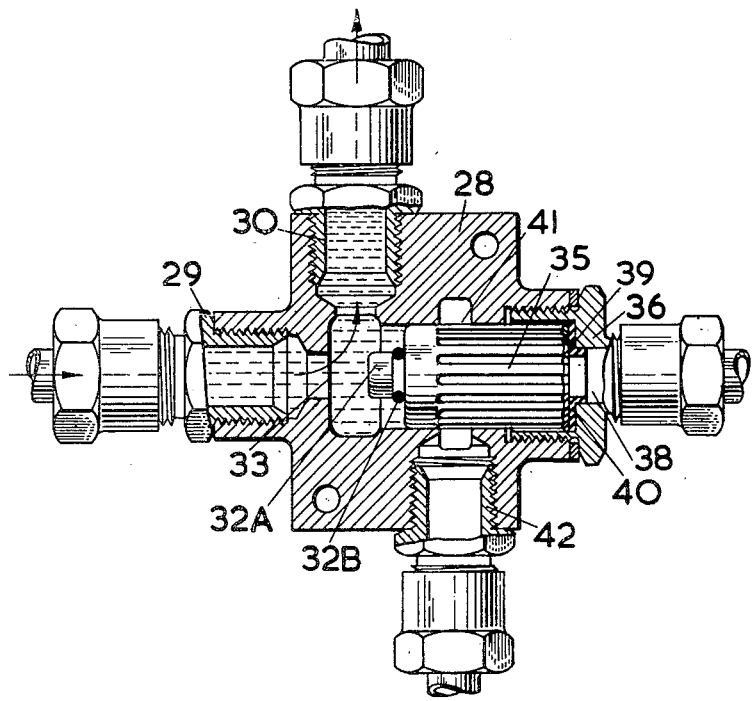
Figure 6 is a view in part section of the form of "dump" valve in open position used in the systems shown in Figures 2 and 4.

In Figure 4 the fuel system is similar to that shown in Figure 2, but the burners 12 are of the spill controlled type and are arranged in two groups necessitating two "dump" valves 14A and 14B (see Figure 6). There are two manifold spill ducts 22 and 23 having pipes 24 and 25 respectively connecting them to their dump valves 14A and 14B. The pipes 24 and 25 are interconnected by a pipe 26 in which is arranged a non-return valve 27 and the throttle valve 16 is connected to the pipe 26 between the valve 27 and the pipe 24.

Figure 5:
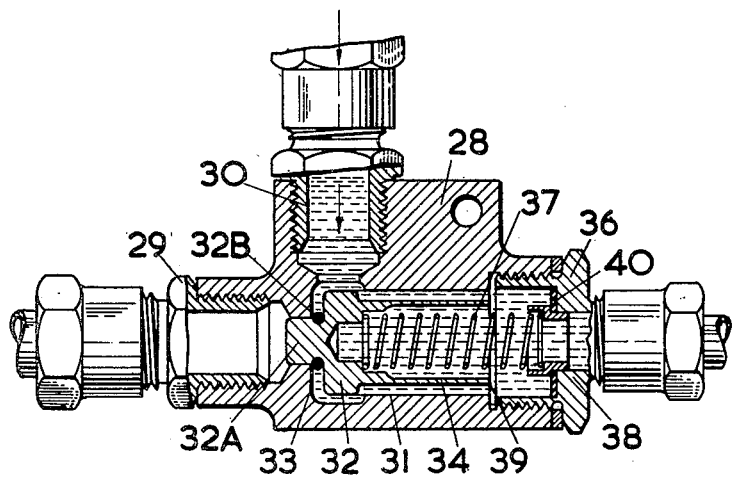
Figure 5 is a vertical section of the form of "dump" valve in closed position used in the systems shown in Figures 1 and 3.

In Figure 5, the valve (either 4, 4A or 4B from Figures 1 and 3) is illustrated. This comprises a body 28 with a union 29 at one end for ingress of fuel. The body has a lateral pipe connetcion 30 which goes to the point of delivery. Within the body 28 is a cylindrical bore 31 in which is slidable a valve element 32. This element 32 has a cylindrical nose 32A surrounded by a composition or synthetic rubber annular face 32B adapted to seat and seal upon a valve seat at 33 in the body 28. The valve element 32 also has a hollow cylindrical skirt portion 34 which is a working fit in the bore 31 when the valve is open for fuel delivery (as in Figure 6). The surface of the cylindrical portion 34 is fluted longitudinally at 35 to enable fuel to pass when the valve element 32 is in the position shown in Figure 5. Extending within the hollow interior of the cylindrical skirt portion 35 between the element 32 and a screwed cap 36 in the body 28 is a compression spring 37 which holds the element 32 against its seat 33. The cap is axially bored to form a vent or drain connection 38 to the pipes 11 or 21 in the Figures 1 to 4. The edge 39 of the skirt portion 34 is arranged to bear against an annular washer 40 (which acts as a seat) forming a positive seal, when the valve element 3 is in the open position for fuel supply to the burners 8 or 12 (as in Figure 6). The effective cross-sectional area of the nose portion 32A of the valve element 32 is arranged to be less than the cross-sectional area of the bore 31 and the cross-sectional area of the cylindrical portion 34 so that when the valve element 32 is seated on its seating 33 a greater fuel pressure is required to open the valve to supply the burners 8 or 12, than is required to hold it open once the nose portion 32A has moved past the seating 33.

Thus when there is no (or insufficient) fuel pressure applied to the valve element 32 its position is shown as in Figure 5. The supply pipe 3 is cut off at the seat 25 (see Figure 4). The connection 30 is open, through the bore 31 and fluting 35, to the drain connection 38 and to the pipes 11 and 21 in Figures 1 to 4. When sufficient pressure is applied on the nose 32A the valve element is puhsed back against the spring 37, and as soon as the valve element 32 opens for fuel supply from the union 29 and pipe 3, the fuel pressure acts on the greater area of the element 32, completing its movement against the spring 37, and holding it stably in its alternative extreme position as shown in Figure 6 in which the edge 39 seals against the washer 40 cutting off the drain connection 38 and the pipes 11 and 21. When the fuel pressure falls below the selected value, the spring asserts itself and returns the element 32 to the condition as shown in Figure 5 permitting fuel downstream of connection 30 from the burners 8 and 12 to flow back and out of the drain connection 38 to pipes 11 and 21, to be suitably dumped. In an engine of the type to which the invention applies, the burners 8 or 12 are exposed to a certain air pressure in the combustion chamber 9, and this expedites dumping and indeed, having cleared out the dumped fuel, blows through burners 8 and pipes 5 and 7 to drain pipe 11 (Figure 1) and through burners 8 and pipes 7, 17, 19 and 20 to drain pipe 21 (Figure 3) which is beneficial as it prevents dribble from burners on shutting down the plant.

The spring 37 may be made adjustable, but preferably its effective load is fixed by selection, since the pressure required first to operate the valve may not be highly critical. The valve areas and spring are of course correlated to achieve the desired results.

The operation of the arrangement of Figure 3 will now be made clearer. The "dump" valve 4A when it opens for supply to its group of burners 8, also admits fuel to the "dump" valve 4B, which when the pressure is sufficient, opens in its turn to supply its group of burners 8. The "dump" valve 4B is intended to be set to operate at a slightly higher pressure than the "dump" valve 4A. This arrangement enables the starting group of burners 8 (two in number) supplied through "dump" valve 4A to be brought into operation first and when the turbine speed has risen and the fuel pressure increased the main group of burners 8 can be brought into action by the opening of the "dump" valve 4B at a slightly higher pressure.

The "dump" valve shown in Figure 6 is intended for use in a fuel system (see Figures 2 and 4) with burners of the spill controlled type, each of which is provided with a cylindrical swirl chamber having an axially directed spill outlet at opposite ends of the chamber and a tangential fuel inlet or inlets to the chamber. When fuel is supplied under pressure to the inlet or inlets the fuel is caused to swirl in the chamber and issue axially through the spill outlet or discharge orifice or both according to the rate of fuel supply to the burners and the rate of controlled spill flow from the burners. The "dump" valve shown in Figure 6 is identical to that shown in Figure 5 with the addition of an annular chamber 41 around the cylindrical bore 31 and of a further lateral union 42 to which the manifold spill duct 13 or 22 or 23 is connected so that when the "dump" valve 14, 14A or 14B (see Figures 2 and 4) operates and cuts off the fuel supply to the burners, in addition to opening the burner fuel supply pipes to drain, the spill flow pipes 13 and 15 (Figure 2) and spill pipes 22, 23, 24, 25 and 26 (Figure 4) are also opened to drain through the union 42 and annular chamber 41.

The air pressure in the combustion chamber 9 will blow back through burners 12 and through pipes 5, 7, 13 and 15 to drain pipe 11 (Figure 2) and through pipes 7, 17, 19, 20, 22, 23, 24, 25 and 26 to drain pipe 21 (Figure 4) which is beneficial as it prevents dribble from the burners on shutting down the plant.

I claim:

1. In a gas turbine combustion system in which fuel is burned in an air flow from a compressor to a turbine which drives the compressor and which employs injection of fuel under pressure through a burner nozzle of the spill controlled type exposed to the pressure of said compressed air flow in a combustion chamber, fuel supply means including a fuel pump adapted to be driven by said turbine, means to delivery fuel to said pump, supply ducting connecting the output of said pump to said burner, drain means open to atmosphere, discharge ducting connecting the burner to said drain means, spill ducting from said burner also having a connection to said drain means, and a valve in said ducting providing in a first position for connection of the supply to said burner and cutting off the burner and the spill ducting from said drain means, and in a second position for connection of the burner and spill ducting to said drain means and cutting off the supply to the burner, means normally resiliently biasing said valve to said second position, said valve being responsive to the pressure of the fuel supply and actuated to connect the burner to the supply or the burner and spill ducting to said drain means according to whether the supply pressure is sufficient to overcome the resilient biasing means, the arrangement being such that upon opening said burner and spill ducting to said drain means the pressure in the combustion chamber can blow back fuel through said burner and spill ducting to said drain means.

2. In a combustion system employing injection of fuel under pressure into a pressurized combustion chamber, a first nozzle, a second nozzle, a fuel pump, a first valve, first conduit means connecting the output of said pump to said first valve and said first valve to said first nozzle, a second valve, second conduit means connecting the second valve to the first conduit means between said first valve and said first nozzle and connecting said second valve to said second nozzle, and means biasing said first and second valves to closed position, both of said valves being exposed to the pressure of fuel flowing to them in the respective conduits and opening in response to the attainment of a predetermined pressure in such conduits, said second valve being arranged to open at a higher pressure than said first valve.

3. In a combustion system employing injection of fuel under pressure into a pressurized combustion chamber, a first nozzle, a second nozzle, a fuel pump, a first valve, a second valve, first conduit means connecting the output of said pump to said first valve and said first valve to said first nozzle, a fuel drain conduit from said first valve open to atmosphere, second conduit means connecting the second valve to the first conduit means between said first valve and said first nozzle and connecting said second valve to said second nozzle, a drain conduit connected to said second valve open to atmosphere, means biasing said first valve to a normal position in which the first conduit means between the valve and the first nozzle is connected to the drain conduit of the first valve, means biasing the second valve to a position in which the second conduit means between the second valve and the second nozzle is connected to the drain conduit for the second valve, both of said valves being exposed to the pressure of a fuel flowing to them in the respective conduits and opening in response to the attainment of a predetermined pressure in such conduits to isolate the respective drain conduits and to establish flow to the respective nozzles, said second valve opening at a higher pressure than said first valve.

4. In a gas turbine combustion system in which fuel is burned in an air flow from the compressor to a turbine which drives a compressor and which employs injection of fuel under pressure through a first and a second burner both of the spill controlled type exposed to the pressure of the compressed air flow in a combustion chamber, fuel supply means comprising a source of fuel under pressure, first and second drains both open to atmosphere, supply ducting connecting said source to said first burner, discharge ducting connecting the first burner to the first drain, spill ducting connecting the first burner with the first drain, a first pressure responsive valve in said ducting in a first position connecting said supply to said first burner while isolating said first burner and the spill ducting from the first drain and in a second position connecting the first burner and the respective spill ducting to the first drain while cutting off the supply of fuel to the first burner, means normally resiliently biasing said first valve to said second position, said first valve moving to said first position in response to pressure of a predetermined magnitude in said supply ducting, a conduit connecting said ducting between said first valve and said first burner to said second valve, a discharge conduit connecting the second burner to the second drain, a spill conduit connecting the second burner with the second drain, a second pressure responsive valve in said conduits in a first position connecting the ducting between said first valve and first burner to said second burner while isolating said second burner and the spill conduit from the second drain and in a second position connecting the second burner and the respective spill conduit to the second drain while cutting off the second burner from the ducting between the first valve and first burner, and means normally biasing the second valve to the second position, said second valve moving to said first position in response to pressure in the ducting between the first valve and the first burner greater than that required to move the first valve to its first position.

5. In a gas turbine combustion system in which fuel is burned in an air flow from the compressor to a turbine which drives the compressor and which emloys injection of fuel under pressure through burner means of the type exposed to the pressure of the compressed air flow in a combustion chamber; fuel supply means comprising a source of fuel under pressure, drain means open to atmosphere, supply ducting connecting said source to said burner means, discharge ducting connecting the burner means to said drain means, pressure responsive valve means in said ducting in a first position connecting said supply to said burner means while isolating said burner means and the ducting from the drain means and in a second position connecting the burner means and the ducting to the drain means while cutting off the supply of fuel to the burner means, means normally resiliently biasing said valve means to said second position, said valve means moving to said first position in response to pressure of a predetermined magnitude in said supply ducting.

6. In a gas turbine plant in which fuel is burned in a combustion chamber in high pressure air flowing from a compressor to a turbine, a liquid-fuel delivery system including a continuous injection atomizing nozzle arranged to discharge into said combustion chamber; a fuel pump adapted to be driven at a high speed by a high speed turbine; and valve means having ports connected respectively to the delivery of said pump and to said nozzle and having also a drain port affording a fuel drain open to atmosphere independent of said pump delivery and suction, said valve means being movable from a first position connecting said nozzle and pump delivery while isolating both from the drain port, to a second position connecting said nozzle and drain while isolating both from the pump, and in said second position providing a free drain path through which fuel remaining in the nozzle connection is discharged through the drain by the air under pressure in the combustion chamber.

7. In a gas turbine plant as claimed in claim 6, means normally biasing said valve means to said second position, said valve means in said second position being exposed to said pump delivery and movable to said first position in response to fuel pressure of a predetermined magnitude.

8. In a gas turbine combustion system in which fuel is burned in an air flow from a compressor to a turbine which drives the compressor and which employs injection of fuel under pressure through a burner nozzle of the spill controlled type exposed to the pressure of said compressed air flow in a combustion chamber, fuel supply means including a fuel pump adapted to be driven at a high speed by a high speed turbine, means to deliver fuel to said pump, supply ducting connecting the output of said pump to said burner, discharge ducting connecting the burner to atmosphere, spill ducting from said burner also having a connection open to atmosphere, and a valve in said ducting providing in a first position for connection of the supply to said burner and cutting off the burner and the spill ducting from atmosphere, and in a second position for connection of the burner and spill ducting to atmosphere and cutting off the supply to the burner, whereby upon opening said burner and spill ducting to atmosphere the pressure in the combustion chamber blows back fuel through the burner and spill ducting to atmosphere.

GEOFFREY BERTRAM ROBERT FEILDEN.

REFERENCES CITED

The following references are of record in the file of this patent:

UNITED STATES PATENTS

| Number | Name | Date |
|---|---|---|
| 926,739 | Hall | July 6, 1909 |
| 1,652,360 | Jackson | Dec. 13, 1927 |
| 1,822,047 | Leask | Sept. 8, 1931 |
| 1,928,839 | Marsden | Oct. 3, 1933 |
| 1,994,974 | Wiedmann | Mar. 19, 1935 |
| 2,004,793 | Montgomery | June 11, 1935 |
| 2,145,533 | Starr | Jan. 31, 1939 |
| 2,154,038 | Evrell | Apr. 11, 1939 |
| 2,331,603 | Falcon | Oct. 12, 1943 |
| 2,345,082 | Waseige | Mar. 28, 1944 |
| 2,358,228 | Hoof | Sept. 12, 1944 |
| 2,364,489 | Taylor | Dec. 5, 1944 |
| 2,372,631 | Stevenson | Mar. 27, 1945 |
| 2,390,806 | Nagel | Dec. 11, 1945 |
| 2,446,523 | Bradbury et al. | Aug. 10, 1948 |